United States Patent [19]

Nagai et al.

[11] 4,245,053
[45] Jan. 13, 1981

[54] MACRORETICULAR ITACONIC ACID ION EXCHANGE RESIN AND PROCESS FOR ITS PREPARATION

[75] Inventors: Susumu Nagai, Suita; Akira Ueda, Takaishi; Kuniei Toyoda, Fujisawa, all of Japan

[73] Assignees: Pfizer Inc., New York, N.Y.; City of Osaka, Osaka, Japan

[21] Appl. No.: 964,858

[22] Filed: Nov. 30, 1978

Related U.S. Application Data

[63] Continuation-in-part of Ser. No. 870,704, Jan. 19, 1978, abandoned.

[30] Foreign Application Priority Data

Jan. 26, 1977 [JP] Japan .................................. 52-8124

[51] Int. Cl.³ .............................................. C08J 5/20
[52] U.S. Cl. ........................................ 521/38; 521/29; 526/318
[58] Field of Search .................... 521/29, 38; 526/317, 526/318

[56] References Cited

U.S. PATENT DOCUMENTS

| | | | |
|---|---|---|---|
| 3,037,052 | 5/1962 | Bortnick | 260/2.2 R |
| 3,219,596 | 11/1965 | Hull | 260/2.2 R |
| 3,275,548 | 9/1966 | Walters | 210/24 |
| 3,322,695 | 5/1967 | Alfrey | 260/2.5 |
| 4,040,990 | 8/1977 | Neely | 260/2.2 R |

OTHER PUBLICATIONS

Polymer Preprints (Japan) vol. 26, No. 1, pp. 87, 88, May 1, 1977.

*Primary Examiner*—Paul R. Michl
*Attorney, Agent, or Firm*—Francis X. Murphy; Charles J. Knuth; Lawrence C. Akers

[57] ABSTRACT

A novel porous, weakly acidic, itaconic acid ion exchange resin and a process for its preparation are disclosed. The process comprises the copolymerization of the beta-monoalkyl ester of itaconic acid and a cross-linking agent such as divinyl benzene in the presence of a pore forming agent selected from the group consisting of aliphatic hydrocarbons of from 5 to 8 carbon atoms, alicyclic hydrocarbons of from 5 to 8 carbon atoms and halogenated hydrocarbons of from 1 to 3 carbon atoms, followed by hydrolysis of the resulting copolymer. The macroreticular itaconic acid ion exchange resin of this invention is characterized by an excellent combination of exchange capacity, heavy metals capturing capacity, ion exchange rate and gas adsorptive capacity.

6 Claims, 8 Drawing Figures

MACRORETICULAR ITACONIC ACID ION EXCHANGE RESIN AND PROCESS FOR ITS PREPARATION

CROSS REFERENCE TO RELATED APPLICATION

This application is a continuation-in-part of the copending application Ser. No. 870,704, filed Jan. 19, 1978 and now abandoned.

BACKGROUND OF THE INVENTION

Itaconic acid is an unsaturated dibasic acid. Its polymerization with an appropriate cross-linking agent would be expected to produce a weakly acidic ion exchange resin having a high exchange capacity. In actual operation, however, there are technical difficulties involved in the polymerization of high melting point (168 degrees centigrade) itaconic acid. According to a process wherein itaconic acid is directly used as a monomer, it is difficult for the polymerization to progress and for resin having a satisfactory exchange capacity to be produced.

In addition, there is a process in which a resin having a bead-like cross-linked structure is obtained from polymerization of liquid itaconic acid diester and divinyl benzene, followed by hydrolysis of the same. In this case, however, the hydrolysis hardly progresses and the process has proved unsuccessful.

Another process in which itaconic anhydride is used as a monomer has been tried. However, the range of application of this process is narrow in view of the fact that copolymerization and hydrolysis progress satisfactorily only when diallyl itaconate, which is highly soluble mutually with itaconic anhydride, is used as the cross-linking agent. Moreover, the ring structure of itaconic anhydride is easily opened by water, thereby forming itaconic acid. Accordingly, it is not possible to obtain bead-like resin by employing water suspension polymerization.

Therefore, a process has been employed in which copolymerization is carried out between the beta-monoalkyl ester of itaconic acid and a cross-linking agent (with the itaconic acid monoester being dispersed as oil drops in water), followed by hydrolysis (U.S. Pat. No. 3,219,596). Satisfactory bead-like ion exchange resin has come to be obtained by this process.

Ion exchange resin obtained by a process using either itaconic anhydride or the beta-monoalkyl ester of itaconic acid as described above has a high exchange capacity and is different from other similar carboxylic acid type resins such as resins made from methacrylic acid as the monomer since it possesses a pair of carboxylic radicals working together. It is known to be particularly effective in adsorbing heavy metal ions, and is useful as a heavy metal capturing agent. In view of the fact that the beads of these resins have a compact structure of a firm gel-type nature, their ion exchange rates are low, which is a major shortcoming.

Under the circumstances, the development of a porous itaconic acid ion exchange resin which retains the aforementioned high exchange capacity and a high level of heavy metal capturing ability and whose ion exchange rate is high has been desired for a long time. However, it has been difficult to prepare the same since itaconic acid resins have all lacked adequate porosity.

SUMMARY OF THE INVENTION

The present inventors have carried out an intensive study for the development of such a porous itaconic acid ion exchange resin and found that a porous ion exchange resin having a high exchange capacity, a superior heavy metal capturing capacity, a high ion exchange rate and possessing such a superior gas adsorptive capacity as could not be realized in the case of gel-type resins could be prepared by making the ion exchange resin in the presence of specific pore forming agents of an extremely unexpected nature.

In particular, this invention relates to a process for the preparation of a weakly acidic itaconic acid ion exchange resin with macroreticular structure in which (1) beta-monoalkyl itaconate, (2) at least one cross-linking agent selected from the group consisting of divinyl benzene, ethyleneglycol dimethacrylate, allyl methacrylate and diallyl itaconate, and, if desired, (3) other copolymerizable monounsaturated monomers are copolymerized in the presence of at least one pore forming agent selected from the group consisting of aliphatic hydrocarbons of from 5 to 8 carbon atoms, alicyclic hydrocarbons of from 5 to 8 carbon atoms and halogenated hydrocarbons of from 1 to 3 carbon atoms, followed by the hydrolysis of the resulting copolymer.

DETAILED DESCRIPTION OF THE INVENTION

Itaconic acid beta-monoalkyl esters having an alkyl group of from one to eight carbon atoms may be used in the present invention. For example, the methyl, butyl, hexyl, octyl, etc., beta-monoesters of itaconic acid may be used. Among these, the ethyl, methyl, propyl, butyl and pentyl beta-monoesters are preferable, and the butyl beta-monoester is the most preferred of all. These itaconic acid monoesters may be used either individually or in combinations of two or more.

It is desirable to use an itaconic acid monoester of a high purity. However, it is possible for it to contain less than about 20 percent of itaconic acid, itaconic acid diester, etc. The coexisting itaconic acid is either dissolved in water at the time of its water suspension polymerization or remains in the oil drops of monoester to be copolymerized and is incorporated into the resin. After having been incorporated into the resin, the coexisting itaconic acid diester is not necessarily hydrolyzed. When its amount is small, it can serve as a constituent component of the resin skeleton without adversely affecting the purposes of this invention.

The compounds which may be used as cross-linking agents in this invention include divinyl benzene, ethyleneglycol dimethacrylate, allyl methacrylate, and diallyl itaconate. Among these, divinyl benzene is preferred. These cross-linking agents may also be used either individually or in combinations of two or more. It is also desirable that cross-linking agents of a high purity be employed. However, it is permissible for such substances as would not obstruct the purposes of this invention to coexist. For example, commercially available divinyl benzene is ordinarily about 55 percent pure, with the rest being ethyl styrene. This commercial product may be used as is as a cross-linking agent. In this case, the aforementioned coexisting vinyl compound is mono-functional and, therefore, does not participate in the cross-linking action. It may be incorporated as a constituent component of the resin by copolymerization.

The proper amount of the cross-linking agent to be used can be determined on the basis of the desired degree of cross-linking and ion exchange capacity, etc. It is generally better to use approximately 5 to 55 percent (by weight counting only cross-linking components), and preferably between approximately 10 and 20 weight percent of cross-linking agents, as compared with the monoester itaconate to be used.

As the other copolymerizable monoethylenically unsaturated monomers which may be used in this invention as the necessity arises, styrene, acrylic acid, acrylic acid alkyl ester, methacrylic acid, methacrylic acid alkyl ester, maleic anhydride, etc. can be mentioned. One or more of these monomers may be used. Their total content is ordinarily in a range between approximately one and 20 weight percent. Styrene, acrylic acid alkyl ester, methacrylic acid alkyl ester, etc. do not make any contribution toward the ion exchange effect, but styrene and the lower esters give rigidity to the resin and the higher esters give flexibility and elasticity to the resin unless hydrolyzed. Acrylic acid, methacrylic acid, maleic anhydride, etc. provide weakly acidic ion exchange groups similar to those of weakly acidic ion exchange resins which are purchased on the market. Thus, they are expected to contribute to the ion exchange effect of the resin in the ordinary sense of the term.

The pore forming agents which are used in this invention include aliphatic or alicyclic hydrocarbons of from 5 to 8 carbon atoms and halogenated hydrocarbons of from 1 to 3 carbon atoms. Cyclohexane, n-hexane, isooctane, chloroform, carbon tetrachloride, etc. can be mentioned as representative examples. Such pore forming agents were not expected to give porosity to an itaconic acid ion exchange resin, as will be described below, and their usefulness was discovered for the first time by the present inventors as the result of an intensive study. The pore forming agents may be used either individually or in combinations of two or more.

Ordinarily, the best pore forming agents for resins are considered to be those which satisfactorily dissolve the monomers but not the resulting copolymers. In the case of styrene-divinyl benzene resins, it is known that heptane, toluene, xylene, alcohols, etc., are all effective as pore forming agents. From this viewpoint, a group of substances which were tentatively expected to be effective in this invention included ethyl formate, ethyl acetate and n-butyl acetate, which are good solvents for the itaconic acid monoester monomers but non-solvents for their polymers. In addition, acetone, methyl-ethylketone, methyl-isobutyl-ketone, etc. are good solvents for the monomers but do not dissolve their polymers. However, none of these solvents performed satisfactorily as a pore forming agent for the cross-linked copolymers of the itaconic acid beta-monoalkyl ester group, contrary to original expectations.

On the other hand, a group of compounds which were expected not to have satisfactory pore forming effect included n-hexane, cyclohexane, isooctane, chloroform, carbon tetrachloride, etc., which did not dissolve the itaconic acid monoester monomers at room temperature. Surprisingly, this group of compounds did show an excellent pore forming effect.

In the preparation of cross-linked resins of the itaconic acid beta-monoalkyl ester system, it was surprisingly found that the desired pore forming effect was obtained by using certain poor solvents which have a very low dissolving effect on the itaconic acid monoester monomers at room temperature and show a dissolving effect for the first time at the polymerization temperature.

In general, the proper amount of the pore forming agent to be used is in the range wherein the copolymer produced is precipitated from the polymerization system, thereby developing a phase separation. When the amount used becomes excessively large, on the other hand, the polymerization yield falls. The said proper amount is also dependent upon the polymerization temperature, polymerization time, density of cross-linking agent used, etc. However, it is ordinarily desirable for the amount of pore forming agent to be in the range between about 30 and 70 weight percent, and preferably in the range between about 40 and 60 weight percent, as compared with the total mixture (excluding aqueous dispersion medium) to be used.

The preparation of porous, weakly acidic itaconic acid ion exchange resin according to this invention may be performed by known methods. For example, said resin may easily be prepared by suspension polymerization in the presence of a suspension stabilizer, a polymerization catalyst, a pore forming agent, etc., in a water polymerization dispersion medium.

Pure water may be used as a water polymerization dispersion medium. Since the solubility in water of the monoalkyl itaconates used as monomer in this invention is substantially high, the dissolution loss may be reduced by the salting-out effect. Use of aqueous solutions of table salt, potassium chloride, lithium chloride, sulfate of soda, etc., are preferred in order to disperse and float the monomer, whose specific gravity is rather large, without letting it settle to the bottom of the container. The use of an aqueous solution of table salt is most preferred. The dispersion medium containing a suspension stabilizer may be approximately one to 10 times the total amount of the itaconic acid monoester, cross-linking agent, pore forming agent, and polymerization catalyst. In cases where the aqueous solutions of the said various salts are used, the concentrations of such aqueous solutions should preferably be in the range between approximately 15 and 40 weight percent.

As a suspension stabilizer, it is possible to employ from approximately 0.005 to two weight percent, as compared with the dispersing medium, of a high-molecular weight organic compound such as gelatine, polyvinyl alcohol, polyvinyl pyrrolidone, methyl cellulose, hydroxy ethyl cellulose and carboxy methyl cellulose, etc., or an inorganic salt such as calcium phosphate, etc.

As a polymerization catalyst, organic peroxides, azo compounds, etc., known as ordinary free radical polymerization catalysts for vinyl compounds, may be employed. Those including benzoyl peroxide, lauroyl peroxide, t-butyl perbenzoate, di-t-butyl peroxide, azobis (isobutyronitrile), etc., may be used.

The proper amount of catalyst may be determined in consideration of the amount of cross-linking agent used, the time of polymerization, etc. The range between approximately 0.2 and 10 weight percent, and preferably between approximately two and seven weight percent, as compared with the itaconic acid monoester, is ordinarily employed.

The polymerization may be carried out within the temperature range required for the progress of polymerization within a desired period of time with a polymerization catalyst being smoothly decomposed; it is usually proper to run the polymerization at between about 50 and 100 degrees centigrade, preferably between about 70 and 85 degrees centigrade, for a period of about 2 to 24 hours, preferably about 10 to 20 hours. The polymerization time is properly selected in light of the polymerization temperature, the concentration of the polymerization catalyst, etc.

The bead-like white non-transparent porous resin which is obtained in the above manner shows an ion exchange effect as is. When it is given a proper post-treatment, followed by hydrolysis, the desired porous ion exchange resin is obtained. As the post-treatment, cleaning with hot water is first carried out to remove the suspension stabilizer, unreacted monomer and pore forming agent. If necessary, extraction using an organic solvent is carried out for the complete removal of the pore forming agent. As the organic solvents which may be used for this purpose, ethyl formate, ethyl acetate, etc., which have affinity with water and can easily be subsequently evaporated, are suitable.

Hydrolysis may be performed by any known method. For example, hydrolysis may be effected by using water or a solution of water and methanol, etc., as a medium and employing a hydrolysis reagent such as sodium hydroxide, potassium hydroxide, hydrochloric acid, etc., at a temperature in the range between about 65 and 110 degrees centigrade for a period of about 5 to 24 hours. Hydrolysis with hydrochloric acid while heating at a temperature above 100 degrees centigrade, with the azeotropic fractionation of the alcohol produced with water, is especially desirable since it raises the extent of reaction.

The porous itaconic acid copolymer according to this invention which is obtained in the manner described above consists of a three-dimensional resin structure containing a large number of fine grains within each of the approximately globular resin beads, with a large number of gaps among said fine grains constituting a large number of fine pores leading to the outer surface of each bead. The total volume of the empty pores which are connected with the outside atmosphere constitutes approximately 10 to 70 percent of the volume of the beads and the total surface area of a single bead, which is a conglomeration of a large number of the aforementioned fine grains, reaches as much as approximately 100 to 10,000 times the surface area of a globe having the same diameter. The diameter of the aforementioned fine pores is in the range between approximately 100 and 5000 Angstroms. The diameters of the fine grains are in the range between approximately 0.5 and one microns. The gap between the said fine grains plays the role of a fine hole (pore) and it is believed that the surface area of the resin is expressed as the sum total of the surface areas of the fine grains.

The porous resin according to this invention is a generally pale yellow, non-transparent, globular resin. It has a bulk specific gravity in the range between approximately 0.2 and 0.8 and bead diameter in the range between approximately 48 and 9 mesh (0.25 to 2 millimeters), these properties being dependent upon the kind of monomer, cross-linking agent and pore forming agent used as well as the conditions of polymerization.

The ion exchange capacity of the porous ion exchange resin of this invention varies depending upon the manufacturing conditions, in particular the amount of cross-linking agent and degree of hydrolysis. However, it is ordinarily in the range between approximately 2 and 11 meq./g.

As for the rate of ion exchange, it commonly takes a long time for ion exchange to be completed since the permeation and diffusion of water from the surface of a resin to its interior becomes rate-controlling, even though it is believed that the rate of the ion exchange reaction itself in resins having a carboxylic functional group is extremely high. Since the ion exchange resin of this invention has a macroreticular structure, however, the diffusion of water into the interior of the resin takes place within a short period of time and ion exchange is completed quickly, as compared with the so-called gel-type resin whose structure is fine and compact.

Furthermore, the ion exchange resin of this invention retains a high heavy metal exchange capacity since it possesses the two carboxyl groups of itaconic acid in the repeating unit. Moreover, the ion exchange resin of this invention has a marked ability to adsorb such basic malodorous gases as ammonia, trimethyl amine, triethyl amine, pyridine, etc., as will be described in Example 7 below. A large part of this gas adsorption ability comes from the physical structure of the porous product of this invention, which is clearly superior to the gel-type resin structure.

Meanwhile, even when an effort is made to cause such a non-polar substance as, for example, toluene to be adsorbed by a similar experimental method, no adsorbent ability is manifested. Accordingly, it can be stated that gas adsorption is not solely dependent upon such physical structure as porosity. Rather, it is clear that it is primarily chemical adsorption based on the action of a weakly acidic functional group (—COOH) that is taking place.

Concerning the use of the resin of this invention as a gas adsorption agent, it is desirable for the initial water content to be more than about 20 weight percent, since its properties are not fully shown when the water content of the resin is too small. In the examples below, a water content of about 30 weight percent was used in order to compare the resin of this invention with a gel-type resin. In the gel-type resin, it is impossible to use a greater water content than this. On the other hand, the water content can be increased further when a porous product of this invention is used. Moreover, the product of this invention shows a higher breakthrough adsorption capacity under conditions involving a high gas flow rate as compared with the gel-type itaconic acid resins and other porous resins (such as Amberlite IRC-50) which are available on the market.

Figure 1:
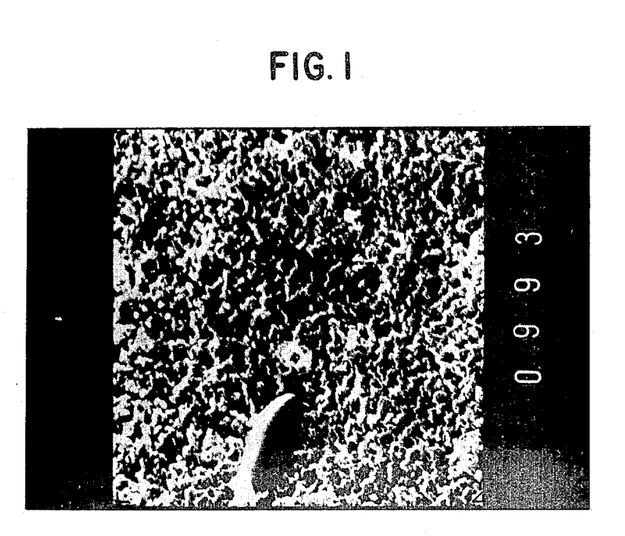
FIGS. 1 and 2 show scanning electron microscopic photographs of the surface of the porous ion exchange resins of this invention prepared in Examples 1 and 2, respectively.
Figure 2:
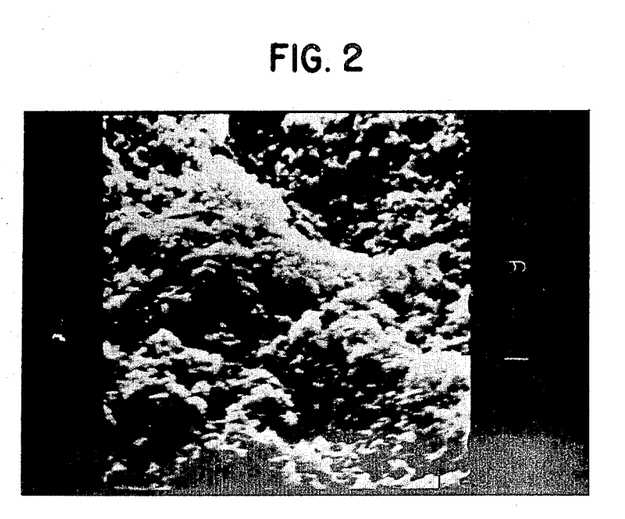

In the case of itaconic acid resins, the gel-type resin has a smooth surface whose structure is transparent and homogeneous, whereas the apparent surface of the porous product of this invention has numerous wrinkles and assumes the form of a non-transparent product. In order to clarify this, the scanning electron microscopic photographs of the surface of the porous resins obtained in Examples 1 and 2 below are shown in FIGS. 1 and 2. A smooth and uniform surface photograph is obtained in the case of a gel-type resin whose structure is compact, whereas porous resins give a photograph in which there are observed a large number of small holes, as is clear in FIGS. 1 and 2.

The ion exchange resin of this invention can easily be regenerated for reuse by ordinary known methods. For example, loaded resin can simply be regenerated by passing through a regenerating agent such as 1 N hydrochloric acid, etc. The resin can be used repeatedly after being given an ordinary pre-treatment such as washing with alkali, water, acid and water.

The following examples illustrate the invention but are not to be construed as limiting the same.

EXAMPLE 1

150 milliliters of saturated table salt water containing one weight percent of hydroxy ethyl cellulose (a suspension stabilizing agent) was placed in a 300 ml. flask equipped with a reflux condenser, stirrer, thermometer and an addition funnel. Heating was carried out with a hot water bath maintained at a temperature of 80 degrees centigrade. A mixture containing 10 grams of beta-monobutyl itaconate, 2.2 grams of divinyl benzene (54 percent, net 12 wt. percent per monomer), 12.2 grams of isooctane (2,2,4-trimethyl-pentane) and 0.6 grams of benzoyl peroxide was then dropped from the addition funnel.

Under stirring in a range between 150 and 200 r.p.m., polymerization was carried out for a period of approximately 10 hours. The bead-like resin, white in color and non-transparent, was filtered and sufficiently cleaned with hot water for the removal of the suspension stabilization agent. The product was then immersed for a period of 24 hours in 100 milliliters of ethyl formate to remove unreacted substances and then dried under reduced pressure at a temperature of 60 degrees centigrade. The yield was 72 percent and the ion exchange capacity 4.2 meq./gram (dry).

The resin was hydrolyzed with 6 N HCl at a temperature of 110 degrees centigrade for a period of 15 hours to give granular porous itaconic acid ion exchange resin whose ion exchange capacity was 8.2 meq./gram (dry) at a yield of 76 percent (97 percent of the theoretical yield of hydrolysis). The polymerization yield, exchange capacity and hydrolysis yield of the resin obtained are shown in Table 1.

The composition of the beta-monobutyl itaconate reactant employed was a mixture of 92.2 percent of beta-monobutyl itaconate, 3.3 percent dibutyl itaconate ester and 4.5 percent itaconic acid. The divinyl benzene reactant (54 percent) was a product purchased on the market with the remainder (46 percent) being mostly ethyl styrene.

Figure 3:
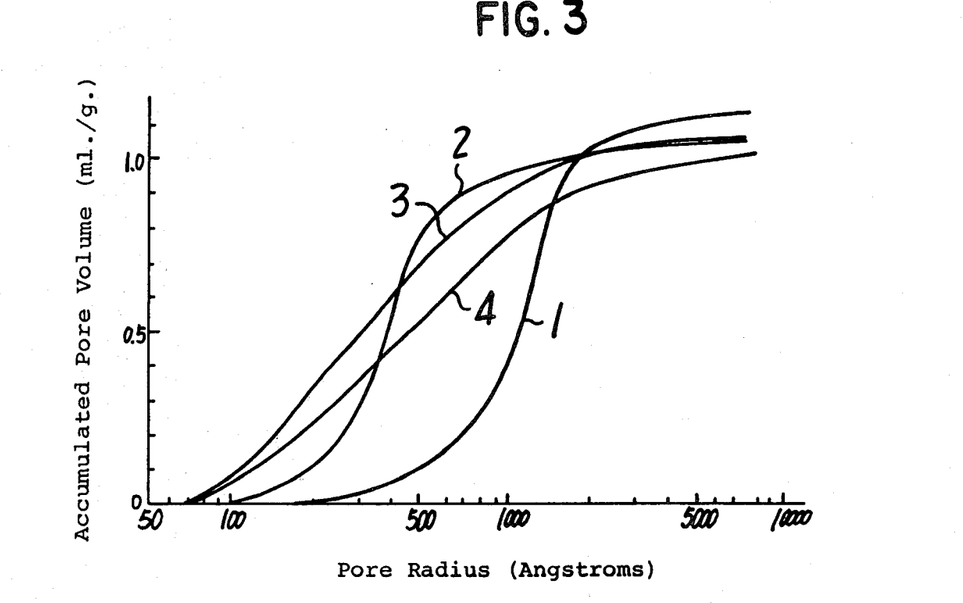
FIG. 3 shows the curves representing the pore diameter distribution of the porous resins of Examples 1 to 4.

The porous structure of the porous resin obtained above was measured by using a mercury pressure Porosimeter Model 65-H manufactured by Carlo Erba Scientific Instrument Division (Italy). The resin was dried, accurately weighed and placed in a capillary which was filled with mercury. After removal of air the capillary was put in the autoclave of the mercury pressure porosimeter and the pressure was increased. The amount of mercury which permeated into the pores of the resin (the pore volume) was measured as a function of the pressure applied. The radius of the pores (r) can be obtained from a formula giving its relationship with the pressure (P) applied, i.e., r equals 75000/P. When the pore radius (r) and the pore volume were plotted on a graph, a curve representing the distribution of pore diameters was obtained. (Refer to curve 1 in FIG. 3.).

Next, the average pore radius (r') was obtained as an average of the 25 percent and 75 percent pore volume values on the curve representing the pore diameter distribution. In addition, the surface area (S) was calculated from the formula S equals 2 V/r' (where V is the total pore volume per unit weight) on the assumption that the pores are empty cylinders. The average pore radius of the resin as obtained by the aforementioned method was 1210 Angstroms and the surface area (S) per unit weight was 19.7 square meters per gram. These various properties of the resin of this example are shown in Table 2.

EXAMPLES 2 TO 4

Porous itaconic acid ion exchange resin was obtained in the same way as in Example 1 except for the fact that the amount of divinyl benzene used was 20, 30 and 59 percent (converted to pure product) as compared with the beta-monobutyl itaconic acid ester used. The polymerization yields, etc., are shown in Table 1 and the various properties of the resin obtained in Table 2. The pore radius distribution curves are shown as curves 2 through 4 in FIG. 3.

TABLE 1

| Example | 1 | 2 | 3 | 4 |
|---|---|---|---|---|
| Amount of divinyl benzene (net) used (%) | 12 | 20 | 30 | 59 |
| Polymerization yield (%) | 72 | 77 | 86 | 88 |
| Exchange capacity before hydrolysis (meq./g.) | 4.2 | 3.4 | 2.8 | 1.5 |
| Hydrolysis yield (%) | 97 | 99 | 100 | 96 |
| Exchange capacity after hydrolysis (meq./g.) | 8.2 | 6.9 | 5.0 | 2.6 |

TABLE 2

| Example | 1 | 2 | 3 | 4 | Gel-type resin |
|---|---|---|---|---|---|
| S (m$^2$/g.) | 19.7 | 52.9 | 51.9 | 33.3 | <0.1 |
| V (ml/g.) | 1.20 | 1.08 | 1.10 | 1.08 | ~0 |
| r' (Angstroms) | 1210 | 410 | 430 | 650 | ~0 |
| Pore radius distribution (Angstroms) | 840 to 1580 | 310 to 510 | 170 to 680 | 240 to 1060 | — |

It is seen from Table 2 that the product of this invention has a surface area in the range between approximately 20 and 53 m$^2$/g., a pore volume in the range between approximately 1.1 and 1.2 milliliters per gram and an average pore radius in the range between approximately 400 and 1200 Angstroms. Because of this porosity, the rate of ion exchange is higher, and the resin shows a superior gas adsorption capacity, in particular under conditions including a high flow rate, as compared with the gel-type resins.

EXAMPLE 5

Comparison of ion exchange rate with gel-type resins

A comparison of the ion exchange treatment rate with the gel-type resins (those of the itaconic acid system which are non-porous) shows the fact that the rate of the porous resin of this invention is markedly higher.

The porous resin of this invention prepared in Example 2 and the aforementioned gel-type resin, both of which had been completely converted to the hydrogen form by a sufficient pre-treatment using 1 N HCl and 1 N NaOH, were accurately weighed in an amount of approximately one gram and then completely dried at a temperature of 100 degrees centigrade. The moisture contents were obtained.

Next, approximately one gram of porous resin (whose dry weight based on the aforementioned result of the preliminary experiment was approximately 0.3 grams) and approximately 0.5 grams of gel-type resin (approximately 0.4 grams as dry weight) were accurately weighed. Each sample was added to a 500 ml. triangular flask equipped with a glass stopper together with 445 ml. of 0.01 N NaOH, and the mixtures agitated for a prescribed period of time in a constant temperature water bath at 35° C.

The mixtures were then filtered and 200 milliliters of each filtration solution were reverse titrated with 0.1 N HCl (using methyl orange as an indicator) to obtain the amount of ion exchange adsorption. The results obtained are summarized in Table 3.

Figure 4:
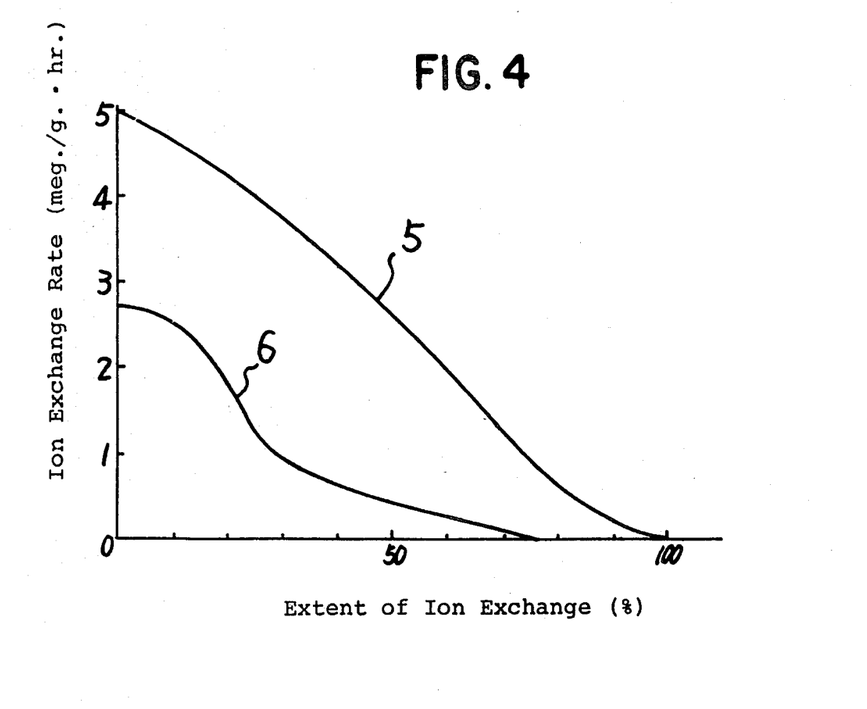
FIG. 4 shows the relationship between the ion exchange rate of the porous resin prepared in Example 2 and the extent of ion exchange.

As is clear in Table 3, the porous resin of this invention reaches approximately an adsorption equilibrium within a period of eight hours, whereas it cannot be said that adsorption equilibrium has been reached even after 18 hours in the case of the gel-type resin. A difference in the rate of permeation by an aqueous solution through the interior of the resin based on the difference in the resin structure is clearly observed. The relationship between the ion exchange rate per unit weight and unit time (meq./g.hr.) and the extent of ion exchange (percent) is shown in FIG. 4. In FIG. 4, curve 5 indicates the product of this invention and curve 6 indicates the conventional product.

TABLE 3

| Time (hours) | 1 | 2 | 5 | 8 | 18 |
|---|---|---|---|---|---|
| Amount of Ion Exchange (meq./g.) Conventional Product | 2.13 | 3.12 | 4.73 | 5.50 | 6.23 |
| Amount of Ion Exchange (meq./g.) Resin of Example 2 | 3.63 | 4.82 | 5.85 | 6.75 | — |

EXAMPLE 6

Measurement of the adsorption capacity for heavy metal ions.

A 2.5 N NH$_4$OH aqueous solution containing 250 p.p.m. divalent metal ions was prepared. Several hundred milligrams of the resin of this invention prepared in Example 1, in the hydrogen form, was accurately weighed and quietly immersed in 500 milliliters of the aforementioned aqueous solution. After standing at room temperature for a period of 24 hours, the resin was filtered and the metal ion concentration before and after the resin immersion was examined in accordance with the atomic absorption spectroscopic method to obtain the heavy metal adsorption capacity of the resin.

As a result, an excellent adsorption capacity of Cu$^{++}$ 3.0, Ca$^{++}$ 3.4, Cd$^{++}$ 2.3 and Ni$^{++}$ 2.8 millimole/(gram of resin) was shown.

EXAMPLE 7

Adsorption of Various Basic Gases (1) Adsorption of Ammonia Gas

Figure 5:
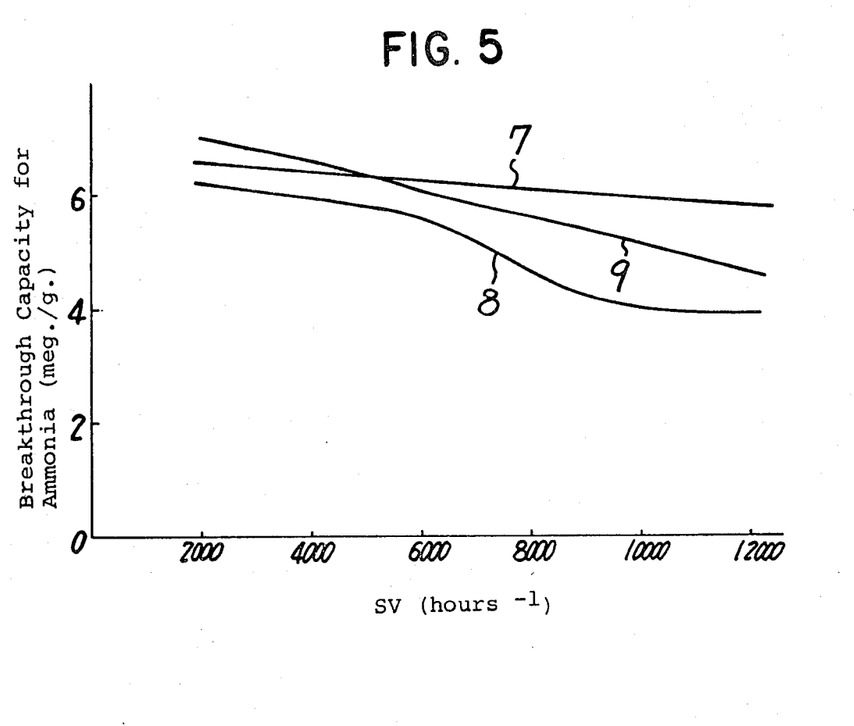
FIGS. 5 through 8 show the adsorption capacities of the porous resin prepared in Example 2 for ammonia gas, trimethyl amine gas, triethyl amine gas and pyridine gas as a function of flowrate.

By using the known dynamic adsorption method, the ammonia gas adsorption capacity of the porous resin of this invention prepared in Example 2 was examined. The adsorption capacity of ammonia obtained by changing the space volumetric flow rate (which will hereafter be abbreviated as SV hours$^{-1}$) of the gas containing from 0.6 to 0.7 percent of ammonia was examined and the result obtained is shown in FIG. 5 as curve 7.

As compared with the gel-type itaconic acid resin (curve 8) and a chelation type porous resin purchased on the market (Amberlite IRC-50, refer to curve 9), the resin of this invention shows no superior features when the flowrate is low but, as the flowrate becomes higher, the rate of drop of adsorption capacity is small, whereas the adsorption capacity markedly drops in the case of the other resins. Thus, it is clear that the resin of this invention shows superior action when the flowrate is high.

Since gas adsorption capacity is greatly affected by the moisture content of the resin, resins whose moisture contents were approximately the same (in the range between 28 and 29 weight percent, as in the subsequent tests) were prepared in the above experiment. The term adsorption capacity as used here indicates the amount of the gas adsorbed until the start of leaking of the gas from the filling column as shown by use of an indicator; it is expressed in meq./gram.

A comparison of the adsorption capacity for ammonia with values described in existing literature (Isao Hashida, Bulletin of the Osaka Municipal Technical Research Institute, 50, 98) is shown in Table 4. It is clear that the efficiency of the product of this invention is markedly higher than in the case of most of the other resins (as much as four times or more).

TABLE 4

| Test | Type of Resin | Moisture Content (%) | Adsorption Capacity (meq./g) | SV |
|---|---|---|---|---|
| 1 | Amberlite IR-120B (R-H form) | 29.6 | 2.37 | 510 |
| 2 | Duolite CS-101 (R-H form) | " | 6.46 | " |
| 3 | Amberlite IRA-400 (R-OH form) | 28.7 | 0.06 | " |
| 4 | Amberlite IRA-400 (R-Cl form) | 27.4 | 0.17 | " |
| 5 | Duolite A-7 (R-OH form) | 33.0 | 0.25 | " |
| 6 | Duolite A-7 (R-Cl form) | 27.2 | 2.23 | " |
| 7 | Bukorit-65 (R-(OH) (NH$_2$HCl) form) | 31.0 | 1.91 | " |
| 8 | Resin of Example 2 (R-H form) | 28.1 | 6.25 | 2000 |

(2) Adsorption of Trimethyl Amine Gas

Figure 6:
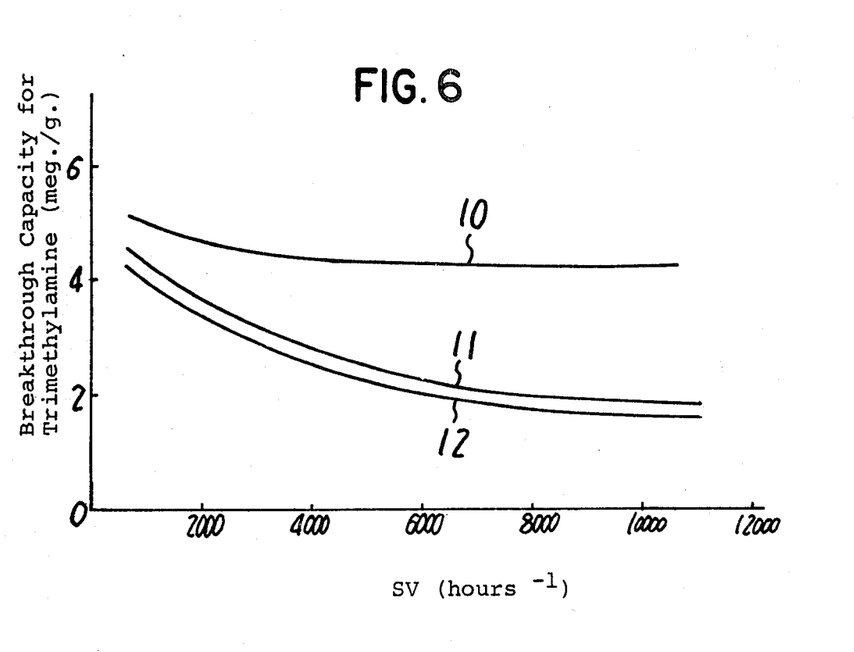

An experiment similar to the one described in Example 7 (1) was carried out relative to trimethyl amine gas. The result obtained is shown in FIG. 6. The concentration of trimethyl amine gas in the air stream was two to four percent. In FIG. 6, curve 10 indicates the product of this invention, curve 11 indicates Amberlite IRC-50 and curve 12 indicates gel-type itaconic acid resin. It is observed that the adsorption capacity of the product of this invention is clearly superior to a product purchased on the market (Amberlite IRC-50) and the gel-type itaconic acid resin.

When a comparison is likewise made with the adsorption capacity for trimethyl amine described in the aforementioned existing literature report, it is seen that the gas adsorption capacity of the product of this invention is superior (see Table 5). In the case of ordinary gel-type resins, moreover, it is known that the adsorption capacity is drastically reduced due to lack of sufficient diffusion and adsorption of the gas into the resin when SV exceeds 510 (Isao Hashida, op. cit, p. 99).

TABLE 5

| Test | Type of Resin | Moisture Content (%) | Adsorption Capacity (meq./g) | SV |
|---|---|---|---|---|
| 1 | Amberlite IR-120B (R-H form) | 22.2 | 2.76 | 510 |
| 2 | Duolite CS-101 (R-H form) | 32.9 | 1.99 | 510 |
| 3 | Amberlite IRA-400 (R-OH form) | — | — | — |
| 4 | Amberlite IRA-400 (R-Cl form) | 24.9 | 0.10 | 510 |
| 5 | Duolite A-7 (R-OH form) | — | — | — |
| 6 | Duolite A-7 (R-Cl form) | 27.2 | 1.18 | 510 |
| 7 | Bukorit-65 (R-(OH)(NH$_2$HCl) form) | 33.7 | 1.51 | 510 |
| 8 | Resin of Example 2 (R-H form) | 30.2 | 4.87 | 1000 |

(3) Adsorption of Triethyl Amine Gas

Figure 7:
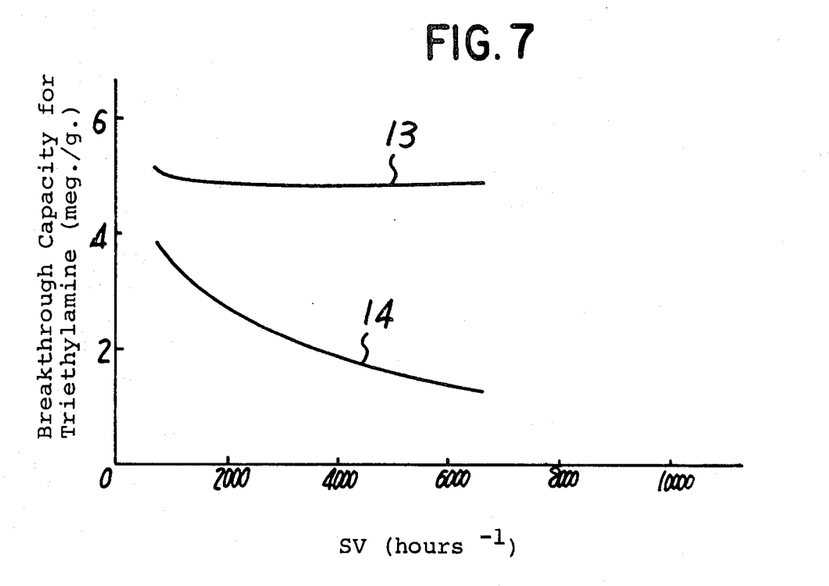

An experiment similar to the one described in Example 7 (1) was carried out with triethyl amine gas. The result obtained is shown as curve 13 in FIG. 7. Although no comparison was made with a product purchased on the market, the product of this invention shows an adsorption capacity which is clearly superior to that for the gel-type itaconic acid resin (refer to curve 14). The concentration of triethyl amine gas in the air stream was in the range between three and four percent.

(4) Adsorption of Pyridine Gas

Figure 8:
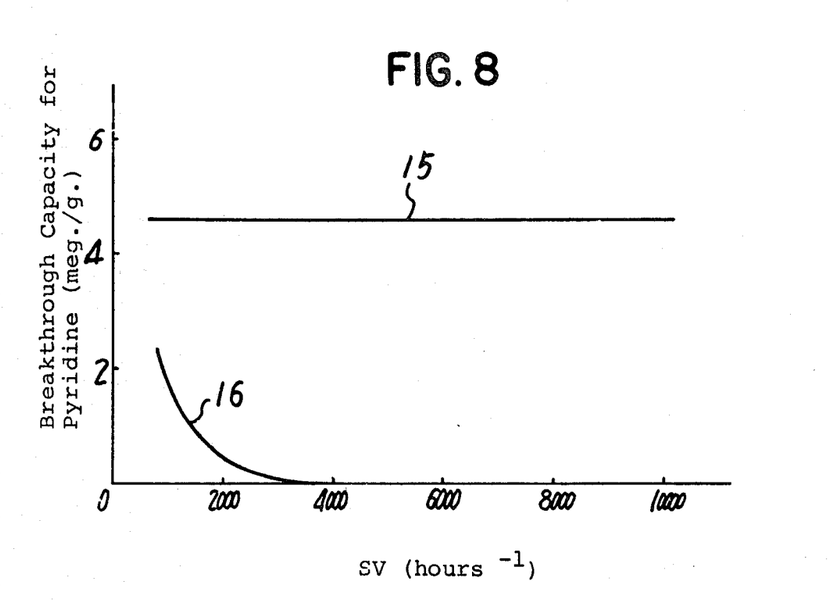

An experiment on the adsorption of pyridine gas was carried out using an air stream whose pyridine concentration was in the range between 0.2 and 0.4 percent. The result obtained is shown in FIG. 8. The porous product of this invention (represented by curve 15) showed superior adsorption capacity which was hardly affected by the flowrate, while the gel-type itaconic acid resin (represented by curve 16) which was used as a comparison scarcely showed any adsorption capacity.

EXAMPLE 8

Porous itaconic acid/allyl methacrylate ion exchange resin was obtained in the same way as in Example 1 except for the fact that 1.0 g. of allyl methacrylate was used instead of divinylbenzene (DVB) as the cross-linking agent. The resin beads thus obtained were slightly weaker in rigidity than the resin of Example 1 but otherwise showed similar properties.

EXAMPLE 9

Porous itaconic acid/diallyl itaconate ion exchange resin was obtained in the same way as in Example 1 except for the fact that 2.1 g. of diallyl itaconate was used instead of DVB as cross-linking agent. The resin thus obtained was quite similar in properties to the resin obtained in Example 8.

EXAMPLE 10

Porous itaconic acid/DVB ion exchange resin was obtained in the same way as in Example 1 except for the fact that 12.8 g. of n-pentane was used instead of isooctane as the pore forming agent. The resin thus obtained was almost identical to that of Example 1.

EXAMPLE 11

Porous itaconic acid/ethyleneglycol dimethacrylate ion exchange resin was obtained in the same way as in Example 1 except for the facts that 10 g. of monomethyl itaconate was used instead of monobutyl itaconate, 4.5 g. of ethyleneglycol dimethacrylate was used instead of DVB as cross-linking agent, and 14.5 g. of carbon tetrachloride was used instead of isooctane as pore forming agent. The resin thus obtained exhibited somewhat reduced porosity (compared to the resin of Example 1) but its mechanical strength was excellent.

EXAMPLE 12

Porous itaconic acid/diallyl itaconate ion exchange resin was obtained in the same way as in Example 1 except for the facts that 10 g. of monomethyl itaconate was used instead of monobutyl itaconate, 4.3 g. of diallyl itaconate was used instead of DVB as cross-linking agent, and 14.3 g. of chloroform was used instead of isooctane as pore forming agent. Resin quite similar to that Example 11 was obtained.

EXAMPLE 13

Porous itaconic acid/acrylic acid/DVB ion exchange resin was obtained in the same way as in Example 1 except for the fact that 1.1 g. of acrylic acid was added to the monomer mixture for copolymerization. Resin quite similar to that of Example 1 was obtained.

EXAMPLE 14

Porous itaconic acid/maleic acid/DVB ion exchange resin was obtained in the same way as in Example 1 except for the fact that 1.0 g. of maleic anhydride was added to the monomer mixture for copolymerization. Resin quite similar to that of Example 1 was obtained.

EXAMPLE 15

Process of Prior Art (A) Solubility of Monobutyl Itaconate

A crystalline sample of monobutyl itaconate (m.p. 36°–38° C.) was tested for solubility in n-butyl acetate by observation under a microscope and found to be easily dissolved by this solvent at room temperature.

(B) Solubility of Poly(monobutyl itaconate)

10 g. of monobutyl itaconate was polymerized in 5 ml. of tetrahydrofuran for 6.5 hours at 60° C., with 0.1 g. of benzoyl peroxide present as a catalyst. The polymeric product was recovered by precipitation with n-hexane, filtered and dried. The resulting polymer was not dissolved by n-butyl acetate at room temperature.

(C) Polymerization of Cross-linked Resin

Since it is a solvent for monobutyl itaconate monomer and a non-solvent for poly(monobutyl itaconate), n-butyl acetate was expected from the prior art to be an effective pore forming agent. A polymerization was carried out in the same way as in Example 1 except for the fact that n-butyl acetate (12.2 g.) was used instead of isooctane. Semi-transparent, non-porous, rigid polymer particles with a milky smooth surface were thus obtained.

EXAMPLE 16

Solubility tests for acetone were carried out in the same way as in Example 15. Acetone was found to be a solvent for monobutyl itaconate but a non-solvent for poly(monobutyl itaconate). A polymerization was carried out in the same manner as in Example 1 except for the fact that 12.2 g. of acetone was used instead of isooctane, with the same results as in Example 15.

EXAMPLES 17-21

Solubility tests were carried out for methylisobutylketone in the same way as in Example 15 and it was found to dissolve monobutyl itaconate but not poly(monobutyl itaconate). Five polymerization runs were carried out as in Example 1 except for the fact that 4.0, 6.2, 7.0, 8.6 and 9.4 g., respectively, of methylisobutylketone were used instead of isooctane. All of these runs gave the same gel-type resin as in Example 15.

EXAMPLE 22

A polymerization was carried out in the same way as in Example 1 except for the fact that a mixture of 5.6 g. of isooctane and 5.6 g. of n-butyl acetate was used as pore forming agent instead of isooctane only. The polymer thus obtained was quite similar to that of Example 15.

EXAMPLE 23

A polymerization was carried out in the same way as in Example 1 except for the fact that a mixture of 5.6 g. of isooctane and 5.6 g. of methylisobutylketone was used as pore forming agent instead of isooctane only. The polymer thus obtained was quite similar to that of Example 15.

Concise Explanation of the Figures

What is claimed is:

1. A process for the preparation of an itaconic acid ion exchange resin with macroreticular structure having an average pore radius in the range between about 0.04 and 0.12 microns which comprises suspension copolymerizing in aqueous suspension medium (1) a beta-monoalkyl itaconate, (2) a cross-linking agent selected from the group consisting of divinyl benzene, allyl methacrylate and diallyl itaconate, and, if desired, (3) one or more other copolymerizable monounsaturated monomers in the presence of a pore forming agent selected from the group consisting of aliphatic hydrocarbons of from 5 to 8 carbon atoms, alicyclic hydrocarbons of from 5 to 8 carbon atoms and halogenated hydrocarbons of from 1 to 3 carbon atoms, which pore forming agent does not dissolve said beta-monoalkyl itaconate at room temperature, and then hydrolyzing the resulting copolymer.

2. A process of claim 1 wherein said beta-monoalkyl itaconate is the beta-butyl monoester of itaconic acid.

3. A process of claim 1 wherein said cross-linking agent is divinyl benzene.

4. A process of claim 1 wherein said pore forming agent is an aliphatic hydrocarbon of from 5 to 8 carbon atoms.

5. A process of claim 1 wherein said pore forming agent is an alicyclic hydrocarbon of from 5 to 8 carbon atoms.

6. A process of claim 1 wherein said pore forming agent is a halogenated hydrocarbon of from 1 to 3 carbon atoms.

* * * * *